UNITED STATES PATENT OFFICE.

ELISHA LEE, OF BALTIMORE, MARYLAND.

METHOD OF PREPARING CANVAS FOR PRINTING, PAINTING, &c.

Specification forming part of Letters Patent No. 17,308, dated May 12, 1857.

*To all whom it may concern:*

Be it known that I, ELISHA LEE, of the city of Baltimore, and State of Maryland, have invented a new and useful Method of Preparing the Surface of Muslin, Linen, Silk, or almost any other article, so as to make it not only valuable for artists in oil, water, or pastel from life, but susceptible of the finest impression in either lithographic, copper-plate, or any other printing for which paper is now used—such as portraits, maps, charts, coast-surveys, models, landscapes, or still life either in oil, ink, water-colors, or by the use of chemicals, of which the following is a specification.

To enable others skilled in the art to make and use my invention, I will procced to describe the process.

Boil well-washed rice in a clean porcelain vessel in water sufficient to prevent its burning. Put in while boiling a small quantity of pulverized borax—say half a dram to a pound of rice—also, one-fourth of an ounce of either gelatine, isinglass, or best white glue, taking care to stir and mix well while boiling. To this rice paste add equal quantities, in bulk, of white lead, (or flake white,) best Paris-white, and white pipe-clay. Mix all well together with linseed-oil, (either boiled or raw,) and grind fine, forming the whole into a thick composition, which, when spread evenly on any required surface and sufficiently dry, will be found to possess an absorbent ground insoluble in boiling water, and capable of receiving the foregoing impressions.

Rice-flour paste may be substituted for the boiled rice, but is not so tenacious. Paper-pulp and potter's clay in small quantities may be added to the above composition and ground fine with it, where the canvas is required to have the tooth preferred by some artists in oil and in pastel painting.

I disclaim the use of glue or flour generally in the preparation of the canvas, and no size must be used before the application of the composition.

What I claim as my invention, and desire to secure by Letters Patent of the United States, is—

The composition of the above ingredients to produce an oil-ground possessing the before-mentioned qualities without sizing the canvas.

ELISHA LEE.

Witnesses:
M. W. MEANS,
R. T. CLARKE.